`US007712091B2`

United States Patent
Muthukumar et al.

(10) Patent No.: US 7,712,091 B2
(45) Date of Patent: *May 4, 2010

(54) METHOD FOR PREDICATE PROMOTION IN A SOFTWARE LOOP

(75) Inventors: Kalyan Muthukumar, Bangalore (IN); Robyn A. Sampson, Pepperell, MA (US); Daniel Lavery, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 1227 days.

This patent is subject to a terminal disclaimer.

(21) Appl. No.: 11/241,144

(22) Filed: Sep. 30, 2005

(65) Prior Publication Data

US 2007/0079302 A1   Apr. 5, 2007

(51) Int. Cl.
*G06F 9/45* (2006.01)
*G06F 15/00* (2006.01)
(52) U.S. Cl. .................. 717/150; 717/153; 717/159; 717/160; 717/161; 712/218; 712/233; 712/237; 712/241
(58) Field of Classification Search .................. None
See application file for complete search history.

(56) References Cited

U.S. PATENT DOCUMENTS

| 5,835,776 | A | * | 11/1998 | Tirumalai et al. | ........... 717/161 |
|---|---|---|---|---|---|
| 5,893,073 | A | * | 4/1999 | Kasso et al. | .................. 705/8 |
| 6,507,947 | B1 | * | 1/2003 | Schreiber et al. | ............ 717/160 |
| 7,263,692 | B2 | * | 8/2007 | Muthukumar et al. | ....... 717/150 |
| 7,275,058 | B2 | * | 9/2007 | Boskovic | ........................ 707/7 |
| 2002/0007484 | A1 | * | 1/2002 | Tirumalai et al. | .............. 717/9 |
| 2004/0068708 | A1 | * | 4/2004 | Sivaraman et al. | ............ 716/10 |
| 2004/0162817 | A1 | * | 8/2004 | Boskovic | ........................ 707/3 |
| 2004/0163053 | A1 | * | 8/2004 | Snider | ............................ 716/3 |
| 2004/0268334 | A1 | * | 12/2004 | Muthukumar et al. | ....... 717/160 |
| 2008/0028381 | A1 | * | 1/2008 | Archambault et al. | ....... 717/152 |

\* cited by examiner

*Primary Examiner*—Tuan Q Dam
*Assistant Examiner*—Isaac T Tecklu
(74) *Attorney, Agent, or Firm*—Blakely, Sokoloff, Taylor & Zafman LLP

(57) ABSTRACT

A method and system for optimizing the execution of a software loop is provided. The method involves the determination of an edge in a critical recurrence cycle in the software loop. The edge is a dependency link between two instructions and contains a dependee and a dependent. The dependee is an instruction that produces a result, and the dependent is an instruction that uses the result. The method further involves performing predicate promotion of at least one of the dependee and the dependent if one or more pre-determined conditions are met.

11 Claims, 10 Drawing Sheets

Software Loop

```
Loop:
        add      v15=v3, v0              // (1)
        add      v10=v11, v15            // (2)
        ld1      v12=[v10]               // (3)
        cmp4eq   v46, v47=v12, v12       // (4)
(v47)   depi     v52=0, v0, 15, 49       // (5)
(v47)   shladd   v53=v52, 1, v14         // (6)
(v47)   ld2      v0= [v53]               // (7)
(v47)   cmp4leuU v48, v49=v0, v8         // (8)
(v49)   addi     v1= -1, v1              // (9)
(v49)   cmp4ne   v45, p0=v1, r0          // (10)
(v45)   br       Loop                    // (11)
```

FIG. 2

```
Loop:           Software Loop
        add     v15=v3, v0              // (1)
        add     v10=v11, v15            // (2)
        ld1     v12=[v10]               // (3)
        cmp4eq  v46, v47=v12, v12       // (4)
        depi    v52=0, v0, 15, 49       // (5)
        shladd  v53=v52, 1, v14         // (6)
 (v47)  ld2     v0= [v53]               // (7)
 (v47)  cmp4leuU v48, v49=v0, v8        // (8)
        addi    v1= -1, v1              // (9)
 (v49)  cmp4ne  v45, p0=v1, r0          // (10)
 (v45)  br      Loop                    // (11)

Loop Exit:
        cmpeq   v50,p0=r0,r0            // (12)
 (v49)  cmpne   v50,p0=r0,r0            // (13)
 (v50)  addi    v1= 1, v1               // (14)
```

FIG. 7

METHOD FOR PREDICATE PROMOTION IN A SOFTWARE LOOP

BACKGROUND

Embodiments of the present invention relate to the field of computer systems. In particular, embodiments of the present invention relate to a method, apparatus, and computer program product for reducing the execution time of instructions in a software loop.

A compiler is a program that reads a source code (in a source language) and translates it into a target code (in a machine language). The compiler, while formulating the target code, forms an intermediate code (in a machine-independent form). For example, a compiler for FORTRAN translates a high-level source code in the FORTRAN programming language into a target code in machine language, which can be executed by a computer processor. In addition, the compiler for FORTRAN, while forming the target code, forms an intermediate code. Machine-independent optimizations may be performed on the intermediate code.

Conventional compilers include three stages—a front end, a middle end and a back end. The front end translates the source code into the intermediate code. The middle end optimizes the intermediate code by using machine-independent optimizations. The back end generates the target code, which is optimized by using machine-dependent optimizations.

Optimization of the intermediate code refers to the transformation of the intermediate code into an alternative functionally equivalent code with reduced execution time. The execution time of the source code depends on a number of factors. These factors include the number of instructions required to execute the source code, the average number of processor cycles required to execute an instruction, and the processor cycle time.

Various methods have been used for optimizing intermediate codes in the machine-independent form in the compiler. These methods facilitate reduction of the height of instructions in a basic block of a software loop. The basic block is a straight-line piece of code without any jumps in the middle of the block.

The bulk of the execution time in a program is usually spent in software loops. Therefore, speeding up the execution of these loops can save execution time. Some loops are resource-bound, i.e., they are bound by the number of issue and instruction slots available for their instructions. However, many other loops are recurrence-bound, i.e., they are limited in performance by the availability of results from an earlier iteration. Traditionally, predicate promotion was used to reduce the height of a computation. This meant that it was used to reorder the computation within a basic block, so that a given instruction could be executed earlier than before. These techniques, though useful for speeding up computation in acyclic regions, may not always speed up the execution of loops. What is important is to reduce the critical recurrence cycles and not just reduce their heights within their basic blocks.

BRIEF DESCRIPTION OF THE DRAWINGS

The various embodiments of the invention will hereinafter be described in conjunction with the appended drawings, provided to illustrate and not to limit the invention, wherein like designations denote like elements, and in which:

FIG. 2 shows an exemplary software loop;

FIG. 7 shows an exemplary embodiment of a predicate-promoted software loop, in accordance with an embodiment of the invention.

DESCRIPTION OF VARIOUS EMBODIMENTS

Various embodiments of the invention provide a method, a system and a computer program product for optimizing the execution of a software loop. The method for optimizing the execution of the software loop includes determining at least one edge in a critical recurrence cycle in the software loop. The edge consists of a dependee and a dependent. The dependee is an instruction that produces a result, and the dependent is an instruction that uses the result. The method also includes performing predicate promotion of at least one of the dependee and the dependent, if one or more pre-determined conditions are met.

Figure 1:
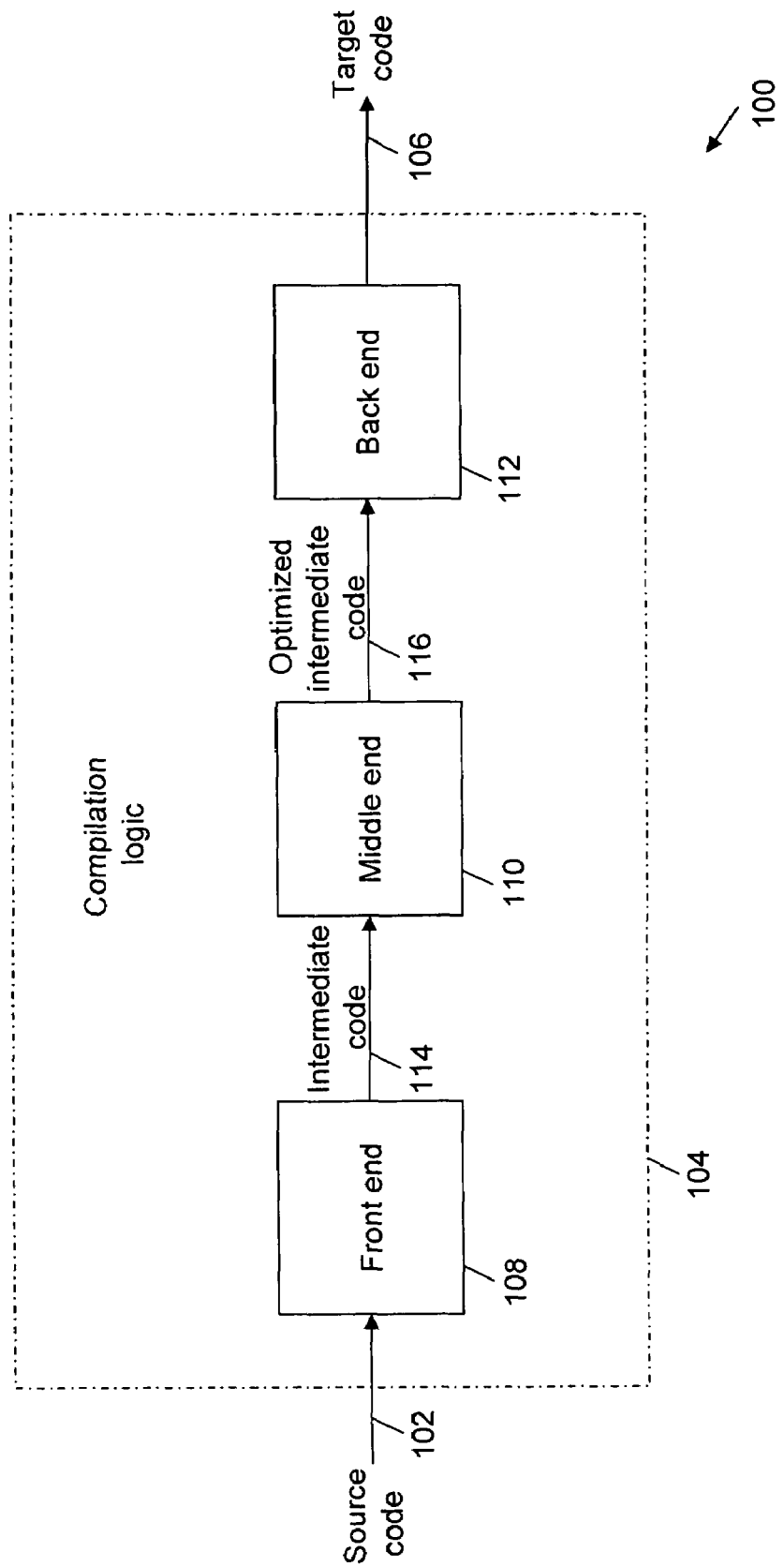
FIG. 1 provides an exemplary operational environment in which an embodiment of the invention can be practiced.

FIG. 1 is a block diagram illustrating an operational environment 100 for various embodiments of the present invention. Environment 100 includes a source code 102, a compilation logic 104, and a target code 106. Compilation logic 104 reads source code 102 in a source language and translates it into target code 106. Target code 106 is a code in a machine language. The machine language is in binary form, i.e., in terms of '1' and '0'. An example of compilation logic 104 is a compiler. Examples of the source language include FORTRAN, BASIC, JAVA, and C.

Compilation logic 104 includes a front end 108, a middle end 110, and a back end 112. Front end 108 receives source code 102 as an input and performs lexical analysis, syntax analysis, and semantic analysis. Further, front end 108 translates source code 102 to an intermediate code 114. Middle end 110 receives intermediate code 114 as an input and translates it into an optimized intermediate code 116. Middle end 110 provides intermediate code optimization in a machine-independent form. Back end 112 receives optimized intermediate code 116 and performs compiler analysis and optimization of intermediate code 114 in a machine-dependent form. Subsequently, back end 112 translates optimized intermediate code 116 into target code 106.

Intermediate code 114 includes at least one software loop. In a software loop, a set of instructions are executed iteratively until a termination condition is achieved. The software loop is successively iterated during the execution of target code 106. The number of cycles between the beginning of successive iterations of the software loop is known as an initiation interval (II). The initiation interval of the software loop is greater of the two—a resource initiation interval and a recurrence initiation interval. The resource initiation interval depends on the number of instructions a computer processor can execute in one cycle, and the computer processor cycle time. The recurrence initiation interval is based on the cycles in the dependence graph of the software loop and the latencies of the processor.

The software loop with a recurrence initiation interval that is greater than the resource initiation interval can be optimized by reducing the recurrence initiation interval. The cycle in the software loop, which has a recurrence initiation interval that is greater than the resource initiation interval, is known as a critical recurrence cycle. In various embodiments of the invention, the recurrence initiation interval of the critical recurrence cycle is reduced.

An exemplary critical recurrence cycle includes a sequence of instruction dependencies, for example, (1)→(2)→(3)→(4)→(5)→(1). In this critical recurrence cycle, the result produced by instruction (1) is used by instruction (2), and the result of instruction (2) is used by instruction (3), and so forth. A dependency link between two successive instructions is called an edge. For example, (1)→(2) is an edge. In the edge, an instruction, which produces a result, is called a dependee, and an instruction, which uses the result, is called a dependent. For example, in edge (1)→(2), instruction (1) is the dependee and instruction (2) is the dependent.

FIG. 2 shows an exemplary software loop 202. Software loop 202 includes 10 instructions, i.e., (1), (2), (3), (4), (5), (6), (7), (8), (9), and (10). Software loop 202 includes a first critical recurrence cycle 204 and a second critical recurrence cycle 206. First critical recurrence cycle 204 is (1)→(2)→(3)→(4)→(5)→(6)→(7)→(1) with a recurrence II of seven cycles. Second critical recurrence cycle 206 is (7)→(8)→(9)→(10)→(7) with a recurrence II of four cycles. In software loop 202, V15, V3, V0, V11, V12, V14, V1, v10, v12, v52, and v53 are virtual general-purpose registers, and V46, V47, V48, V49, and V45 are virtual predicate registers. The virtual registers V0, V11, V12, V14, V1, V46, V47, V48, V49, and V45 are live out of software loop 202. A virtual register is live out of the software loop if a value stored by it is used by an instruction outside the software loop. The virtual registers v10, v12, v52, and v53 are limited inside software loop 202. A virtual register is limited inside the software loop if a value stored by it is used only inside the software loop. The virtual general-purpose registers store data and addresses. The virtual predicate registers V46, V47, V48, V49, and V45 store one bit values of "0" and "1". The one bit value "0" is equivalent to false and the one bit value "1" is equivalent to true.

The virtual predicate register V47 acts as a predicate of the instructions (5), (6), (7), and (8), and the virtual predicate register V49 acts as a predicate of the instructions (9) and (10). The instructions predicated by a virtual predicate register storing the one bit value of "0" are not executed and the instructions predicated by a virtual predicate register storing a one bit value of "1" are executed. For example, if in instruction (4), the virtual predicate register V47 stores the one bit value of "1", then the instructions (5), (6), (7), and (8) will be executed. Further, if the virtual predicate register V47 stores the one bit value of "0", then the instructions (5), (6), (7), and (8) will not be executed.

Various embodiments of the invention provide for predicate promotion of software loop 202, to reduce the number of instructions in first critical recurrence cycle 204 and/or second critical recurrence cycle 206. Predicate promotion is a technique that can be used to remove the predicate completely from some of the predicated instructions or to relax the predicate so that the predicated instruction can be executed earlier in the sequence.

Figure 3:
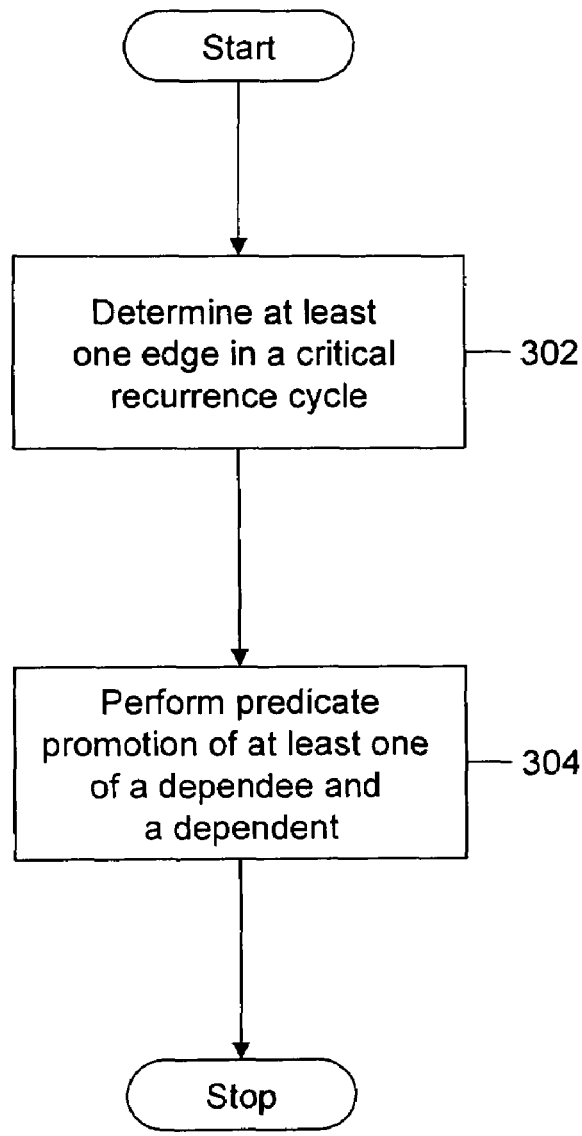
FIG. 3 is a flowchart of a method for optimizing the execution of a software loop, in accordance with an embodiment of the invention.

FIG. 3 is a flowchart of a method for optimizing the execution of software loop 202, in accordance with an embodiment of the invention. At 302, an edge is determined in a critical recurrence cycle. The edge is a dependency link between two instructions, which consists of a dependee and a dependent. The dependee is an instruction that produces a result, and the dependent is an instruction that uses the result. For example, referring to FIG. 2, in edge (5)→(6), instruction (5) is a dependee and instruction (6) is a dependent.

Thereafter, at 304, predicate promotion is performed on at least one of the dependee and the dependent, if one or more pre-determined conditions are met. The pre-determined conditions can be selected so that when they are met, the logic of the software loop is maintained after the predicate promotion is performed. In an embodiment, the dependee is checked for a first set of conditions and the dependent is checked for a second set of conditions before the predicate promotion is performed.

Figure 4A:
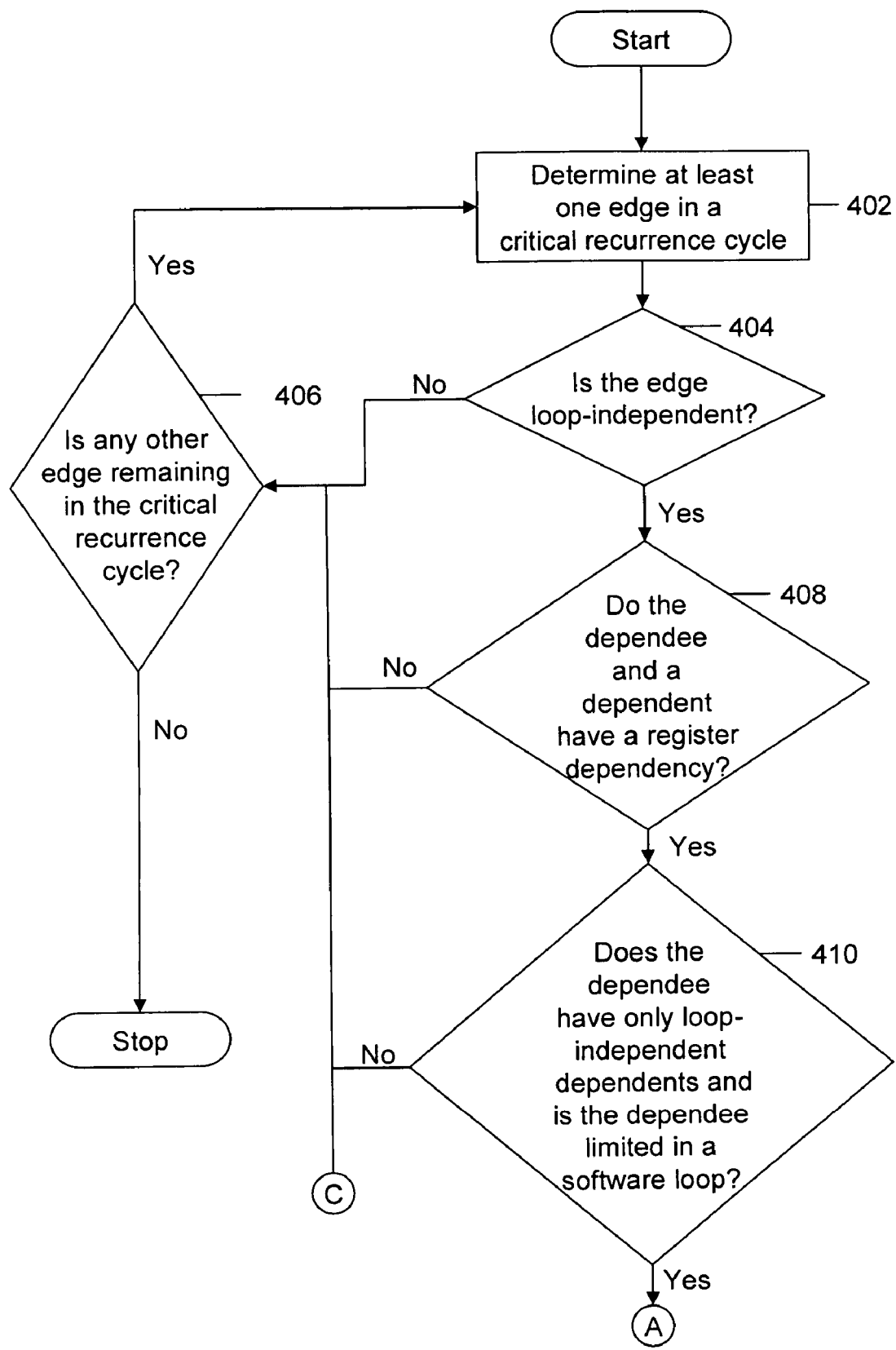
FIGS. 4A and 4B represent a flowchart for optimizing the execution of a software loop, in accordance with another embodiment of the invention.
Figure 4B:
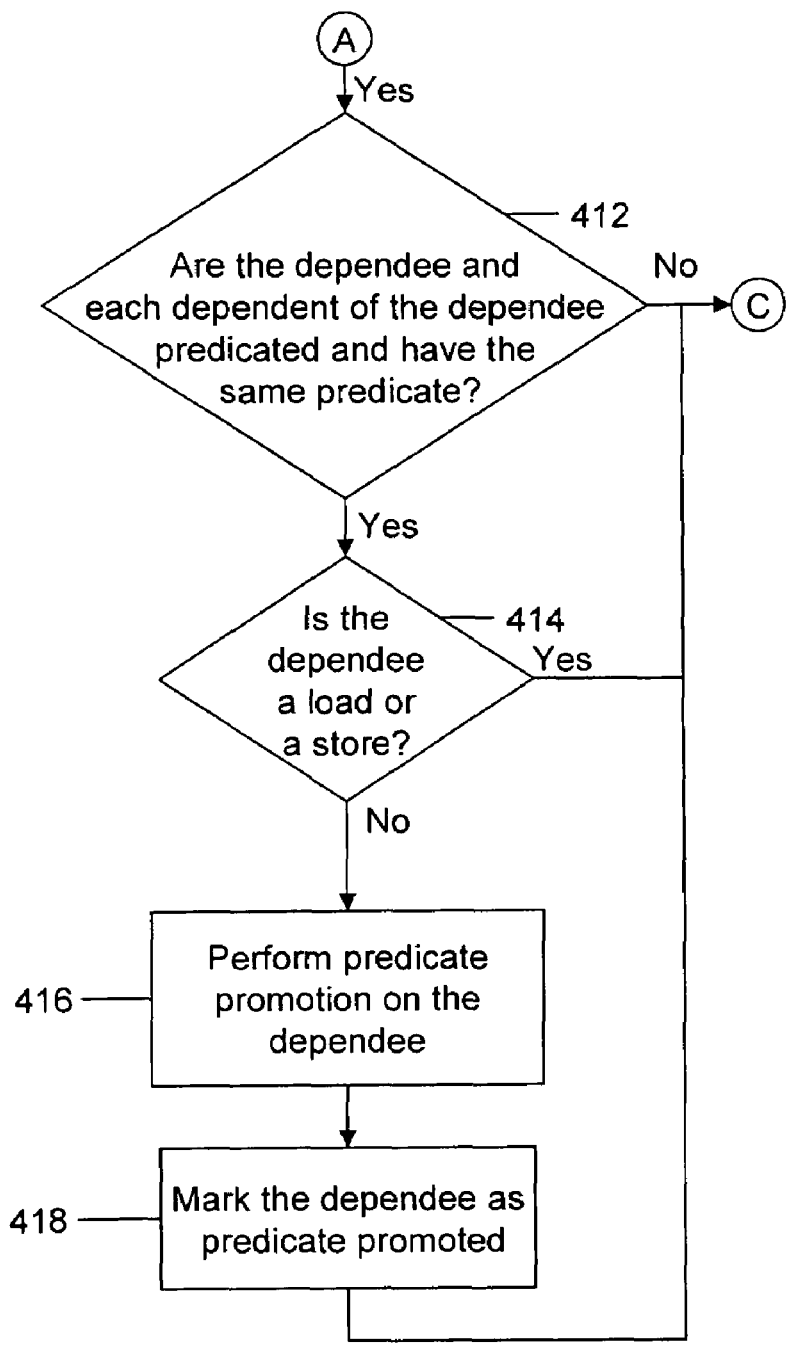

FIGS. 4A and 4B represent a flowchart for optimizing the execution of a software loop 202, in accordance with another embodiment of the invention. At 402, at least one edge is determined in a critical recurrence cycle. At 404, a check is performed to determine if the edge is a loop-independent edge. The loop-independent edge is an edge whose dependee and dependent are executed in the same iteration of a software loop. For example, referring to FIG. 2, in first critical recurrence cycle 204, edges (1)→(2), (2)→(3), (3)→(4), (4)→(5), (5)→(6), (6)→(7) are loop-independent edges. Further, edge (7)→(1) is a loop-carried edge. In a loop-carried edge, the execution of the dependee and the dependent is carried out in different iterations of the software loop. Therefore, edge (7)→(1) is a loop-carried edge, since dependee (7) and dependent (1) are executed in different iterations of software loop 202. If the edge is loop-carried, 406 is performed.

Referring back to 404, if the edge is loop-independent, 408 is performed. At 408, a check is performed to determine if the dependee and the dependent have a register dependency. In a register dependency, the result of the dependee, which is an input to the dependent, is stored in a register. For example, referring to FIG. 2, in first critical recurrence cycle 204, in edge (5)→(6), instruction (5) computes a value that is stored in virtual general-purpose register v52, and instruction (6) uses the value stored in virtual general-purpose register v52. Therefore, in edge (5)→(6), the dependee and the dependent have a register dependency. If the dependee and the dependent do not have a register dependency, 406 is performed.

Referring back to 408, if the dependee and the dependent have a register dependency, 410 is performed. At 410, a check is performed to determine if the dependee only has loop-independent dependents and the dependee is limited in software loop 202. The loop-independent dependents are the dependents that use the result of the dependee in the same iteration of the software loop in which the result is produced. For example, referring to FIG. 2, in first critical recurrence cycle 204, in edge (5)→(6), dependent (6) uses a value stored by virtual general-purpose register v52, which was produced by dependee (5) in the same iteration of software loop 202. Therefore, instruction (5) has a loop-independent dependent. However, in edge (7)→(1), a value stored in virtual general-purpose register V0, computed in dependee (7), is used by dependent (1) in a different iteration of software loop 202. Hence, dependee (7) does not have loop-independent dependents.

Further, the dependee is limited in the software loop if the result produced by the dependee is not used outside the software loop. For example, referring to FIG. 2, in edge (5)→(6), a result produced by dependee (5) is stored in virtual general-purpose register v52, which is limited in software loop 202. If the dependee has loop-carried dependents, or the dependee is not limited in software loop 202, 406 is performed.

Referring back to 410, if the dependee has only loop-independent dependents and the dependee is limited in software loop 202, 412 is performed. At 412, a check is performed to determine if the dependee and each dependent of the dependee are predicated and have the same predicate. For example, referring to FIG. 2, in edge (5)→(6), dependee (5) is predicated by virtual predicate register V47. Dependee (5) has one dependent, i.e., dependent (6). Dependent (6) is predicated by virtual predicate register V47. Hence, dependee (5) and dependent (6) are both predicated by virtual predicate register V47. If the dependee and each dependent of the dependee are not predicated or do not have same predicate, 406 is performed.

Referring back to 412, if the dependee and each dependent of the dependee are predicated and have the same predicate, 414 is performed. At 414, a check is performed to determine if the dependee is a load instruction or a store instruction. If the dependee loads a value from any memory location, then it is a load instruction. If the dependee stores a value to any memory location, then it is a store instruction. For example, referring to FIG. 2, in instruction (3), a value is loaded from an address stored in the virtual general-purpose register v10. The value is loaded in the virtual general-purpose register v12. Hence, instruction (3) is a load instruction. If a result of the dependee is a load instruction or a store instruction, 406 is performed.

Referring back to 414, if the result of the dependee is neither a load instruction nor a store instruction, 416 is performed. At 416, predicate promotion is performed on the dependee. For example, referring to FIG. 2, in first critical recurrence cycle 204, in edge (5)→(6), dependee (5) satisfies the first set of conditions for performing predicate promotion of a dependee. Hence, predicate promotion is performed on dependee (5). At 418, the dependee is marked as predicate promoted. Thereafter, 406 is performed.

At 406, a check is performed to determine if another edge in the critical recurrence cycle remains, for which 402 has not been performed. If another edge remains, 402 is repeated. However, if it is determined at 406 that no edge in the critical recurrence cycle remains, then the method explained in conjunction with FIGS. 4A and 4B is performed for other critical recurrence cycles in software loop 202. For example, in an exemplary critical recurrence cycle (1)→(2)→(3)→(4)→(5)→(1), suppose edge (1)→(2) has been determined. After determining (1)→(2) based on the pre-determined conditions, another edge in the critical recurrence cycle (2)→(3) is determined. If each edge has been determined, then the method is performed for other critical recurrence cycles in software loop 202.

In various embodiments of the invention, each instruction that is the dependee of the edge in a critical recurrence cycle in software loop 202, has a corresponding Boolean register linked to it. The Boolean register is set as 'false' before predicate promotion is performed. When the dependee of the edge is predicate promoted at 416, then the Boolean register for the dependee is set as 'true'. Further, only those edges with dependees that have the Boolean register set as 'false' are determined at 402. As a result, an edge that is determined at 402 is not determined again.

In an embodiment of the invention, predicate promotion may not be performed on an edge if floating-point computations are involved in the edge. It may be apparent to a person skilled in the art that the method for edges that involve floating point computations may be disallowed, depending on the requirement.

In an exemplary embodiment of the invention, the method explained in conjunction with FIGS. 4A and 4B can be performed by using the following pseudo code:

```
Compute all the critical recurrence cycles in the loop;
For each edge in all critical recurrence cycles, mark Pred_Promoted
  (dependee (edge))
  = False;
For each critical recurrence cycle C in the loop {
  For each edge E in critical recurrence cycle C {
    If (Pred_Promoted (dependee (E))) {continue ;}
    If (Loop_carried (E)) {continue;}
    If (E is not caused by a register dependence) {continue ;}
    If (dependee (E) has loop-carried dependents OR is live out
      of the loop) {continue ;}
    If (dependee (E) and dependent (E) have different predicates
      OR are not predicated) {continue ;}
    If (dependee (E) has multiple dependents which have
      different predicates)
    {continue ;}
    If (dependee (E) is a load or a store) {continue ;}
    // If either the dependee or the dependent involves Floating point
  computation, it is not safe to do predicate promotion, as it may lead to FP
  exceptions or performance losses due to NaNs, etc.
    If (dependee (E) OR dependent (E) uses or writes FP
      registers) {continue ;}
    Predicate (dependee (E)) = p0;
    // Do the predicate promotion
    Pred_Promoted (dependee (E)) = True;
  } End For each edge E;
} End For each critical recurrence cycle;
```

Figure 5A:
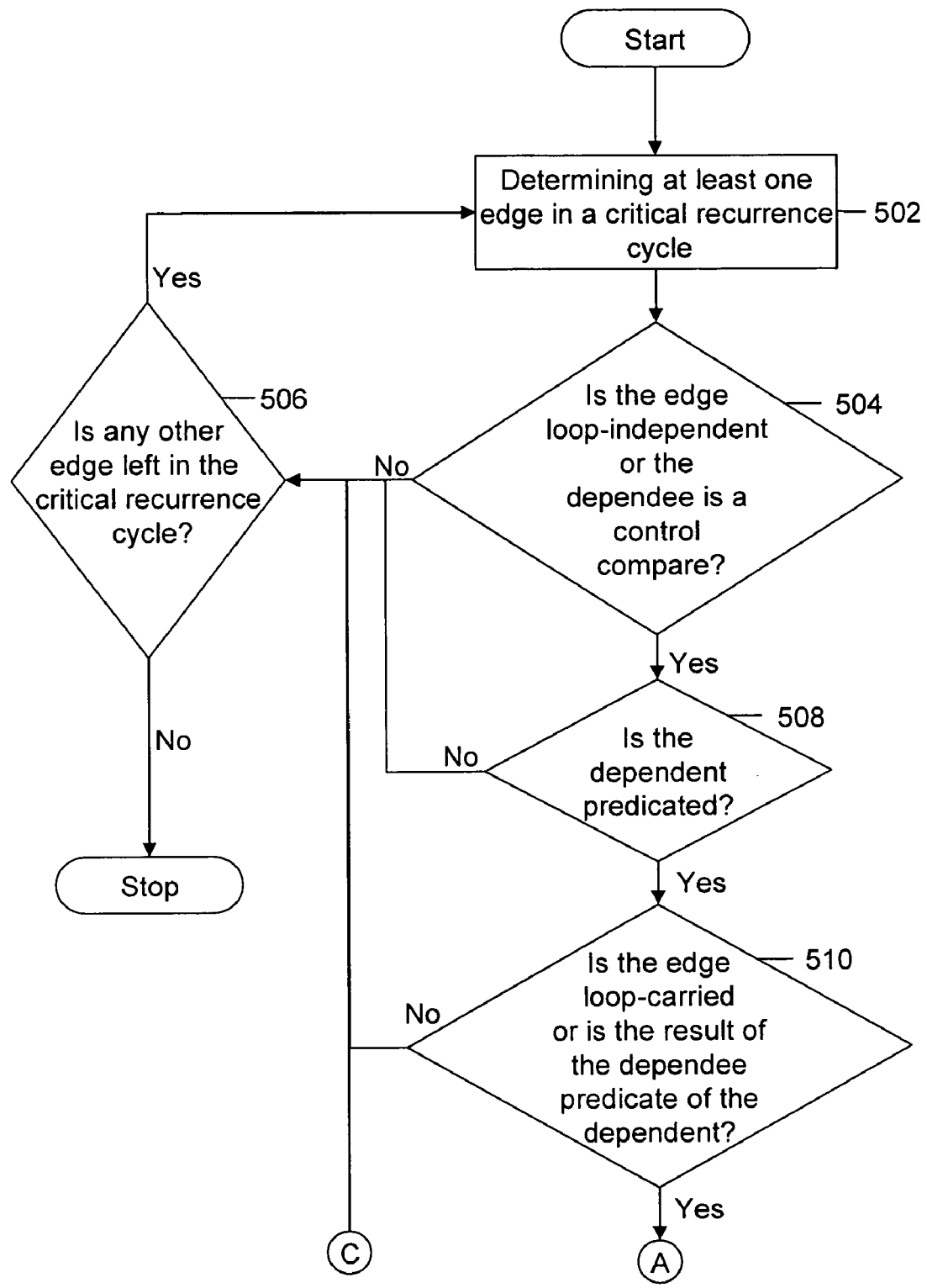
FIGS. 5A and 5B represent a flowchart for optimizing the execution of a software loop, in accordance with yet another embodiment of the invention.
Figure 5B:
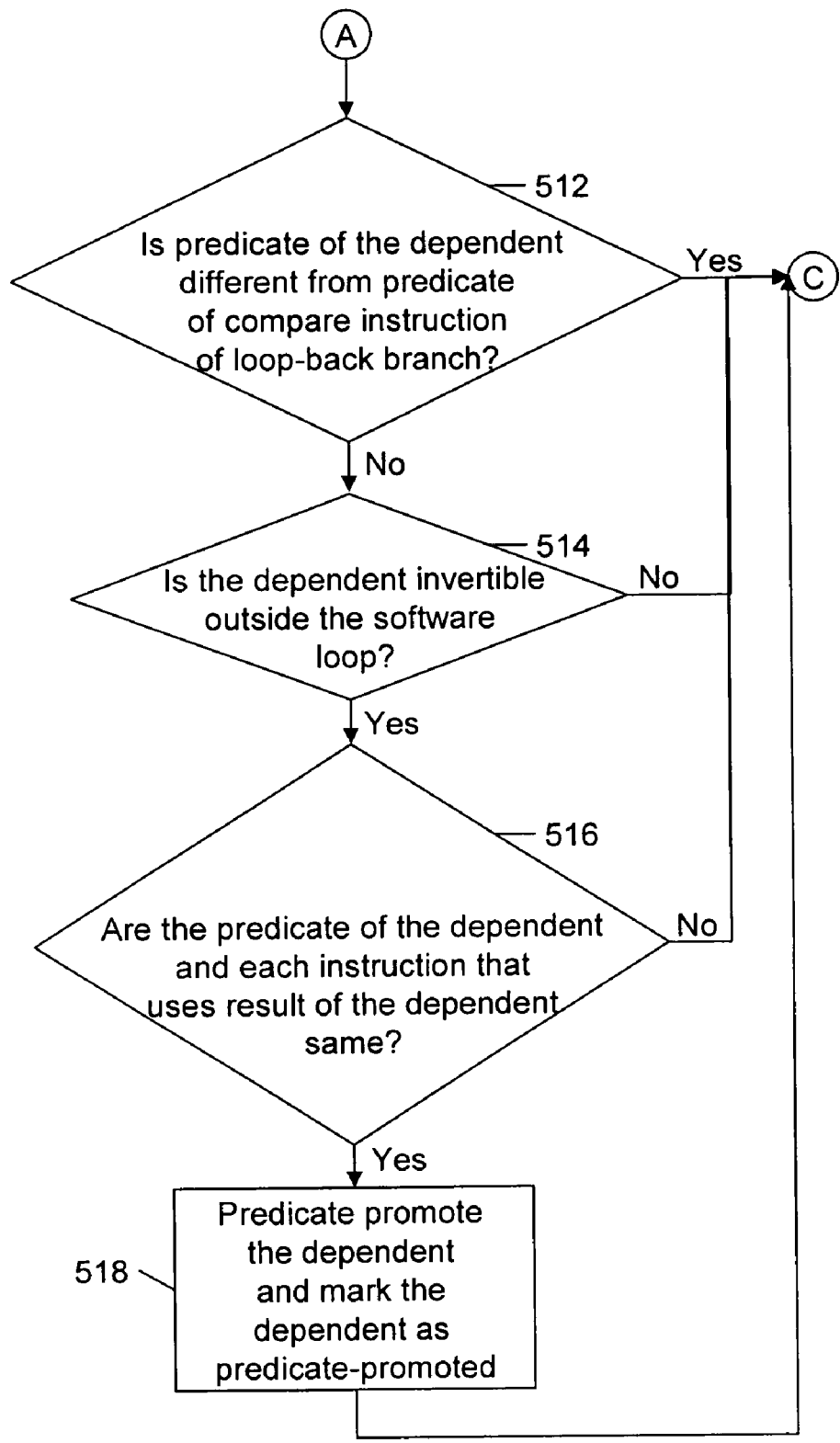

FIGS. 5A and 5B represent a flowchart for optimizing the execution of a software loop 202, in accordance with yet another embodiment of the invention. At 502, at least one edge is determined in a critical recurrence cycle. At 504, a check is performed to determine if the edge is loop-independent or the dependee is a control compare. For example, referring to FIG. 2, in second critical recurrence cycle 206, edge (8)→(9) is loop-independent because (8) and (9) are executed in the same iteration of software loop 202.

Further, the control compare instruction takes the decision whether the control stays in software loop 202 or exits it. For example, referring to FIG. 2, in edge (10)→(7), instruction (10) is the control compare, since a result produced by instruction (10) is stored in virtual predicate register V45. Virtual predicate register V45 predicates instruction (11), which conditionally breaks the control from software loop 202. If virtual predicate register V45 stores the one bit value of "0", the control breaks out of software loop 202. However, if V45 stores the one bit value of "1", the control stays in software loop 202.

Referring back to 504, if the edge is loop-carried, and the dependee is not the control compare, 506 is performed. In a loop-carried edge, the dependee and the dependent are executed in different iterations of the software loop. However, if the edge is loop-independent or the dependee is the control compare, 508 is performed. At 508, a check is performed to determine if the dependent is predicated. For example, referring to FIG. 2, in second critical recurrence cycle 206, in edge (8)→(9), dependent (9) is predicated by virtual predicate register V49. If the dependent is not predicated, 506 is performed.

Referring back to 508, if the dependent is predicated, 510 is performed. At 510, a check is performed to determine if the edge is loop-carried or the result of the dependee is the predicate of the dependent. For example, referring to FIG. 2, in second critical recurrence cycle 206, edge (10)→(7) is loop-carried, since dependee (10) and dependent (7) are executed in different iterations of software loop 202. Further, referring to FIG. 2, in second critical recurrence cycle 206, in edge (8)→(9), the result produced by dependee (8) is stored in virtual predicate register V49, which acts as a predicate of dependent (9).

If the edge is loop-independent and the result of the dependee is not the predicate of the dependent, 506 is performed. Referring back to 510, if the edge is loop-carried or the result of the dependee is the predicate of the dependent, 512 is performed. At 512, a check is performed to determine if the predicate of the dependent is different from the predicate of the compare instruction of a loop-back branch. The loop-back branch is a conditional instruction that either keeps the control flow within the software loop or takes it out of the software loop. For example, referring to FIG. 2, in second critical recurrence cycle 206, instruction (11) is the loop-back branch.

Referring to FIG. 2, in edge (8)→(9), the predicate of dependent (9) and the predicate of compare instruction (10) of loop-back branch (11) is the virtual predicate register V49. If the predicate of the dependent is different from the predicate of the compare instruction of the loop-back branch, 506 is performed.

However, if the predicate of the dependent is the same as the predicate of the compare instruction of loop-back branch, 514 is performed. At 514, a check is performed to determine if the dependent is invertible outside software loop 202. The dependent is invertible if the result produced by the dependent can be inverted outside software loop 202. For example, referring to FIG. 2, the instructions using op-codes "addi", "shladd", etc., are invertible outside software loop 202. If the dependent is not invertible outside software loop 202, 506 is performed.

Referring back to 514, if the dependent is invertible outside software loop 202, 516 is performed. At 516, a check is performed to determine if the predicate of the dependent and the predicate of each instruction that uses the result of the dependent in the current iteration of the software loop are the same. For example, referring to FIG. 2, in second critical recurrence cycle 206, in edge (8)→(9), the predicate of dependent (9) is V49. A result produced by dependent (9) is stored in the virtual general-purpose register V1. The result stored in the virtual general-purpose register V1 is used by instruction (10). Instruction (10) is predicated by virtual predicate register V49. Hence, the predicate of dependent (9) and instruction (10) is the same, i.e., V49.

If the predicate of the dependent and each instruction that uses the result of the dependent in the current iteration are not the same, 506 is performed. However, if the predicate of the dependent and each instruction that uses the result of the dependent in the current iteration are the same, 518 is performed. At 518, predicate promotion is performed on the dependent.

In an embodiment, a further check may be performed to verify whether the result of the dependent of the edge is live out of the software loop, and to invert the result of the dependent of the edge outside of the software loop, as necessary. For example, when the result of the dependent is live out of the software loop, the complement of the predicate of the dependent can be computed. An instruction is then added, to follow the software loop for execution after the loop exit. The instruction is predicated with the computed complement of the predicate of the dependent and the result of the instruction is the inverse of the dependent.

At 506, a check is performed to determine if another edge in the critical recurrence cycle remains, for which 502 has not been performed. If another edge remains, 502 is repeated. In an embodiment, if it is determined at 506 that no edge in the critical recurrence cycle remains, then the method explained in conjunction with FIGS. 5A and 5B is performed for other critical recurrence cycles in software loop 202.

In various embodiments of the invention, each instruction that is the dependent of the edge in a critical recurrence cycle in software loop 202 has a corresponding Boolean register linked to it. The Boolean register is set as 'false' before predicate promotion is performed. When the dependent is predicate promoted at 518, then the Boolean register for the dependent is set as 'true'. Further, only those edges with dependents that have a Boolean register set as 'false' are determined at 502. As a result, an edge that is determined at 502 is not determined again.

Figure 6:
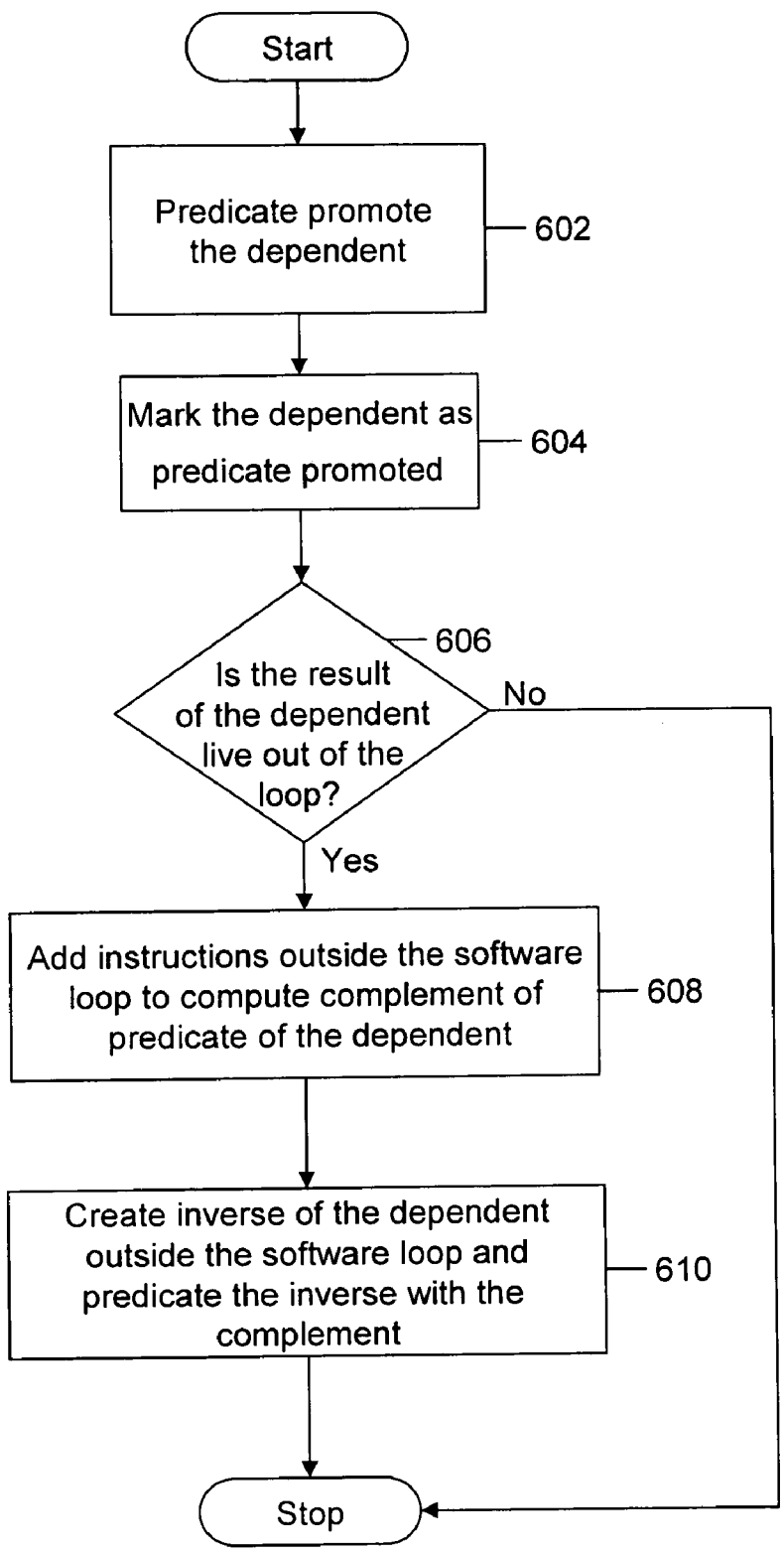
FIG. 6 is a flowchart of a method for performing the predicate promotion of a dependent, in accordance with an embodiment of the invention.

FIG. 6 is a flowchart of a method for performing the predicate promotion of a dependent, in accordance with an embodiment of the invention. At 602, predicate promotion of the dependent is performed. Thereafter, at 604, the dependent is marked as predicate promoted. At 606, a check is performed to determine if the result of the dependent is live out of software loop 202. A result is live out of the software loop, if its value is used by an instruction outside the software loop. For example, referring to FIG. 2, in edge (8)→(9), the result of dependent (9) is stored in virtual general-purpose register V1 that is live out of software loop 202. If the result of the dependent is live out of software loop 202, 608 is performed.

At 608, an instruction is added outside software loop 202, to compute a complement of the predicate of the dependent. At 610, an additional instruction that is the inverse of the dependent is created outside software loop 202, and is predicated with the complement of the predicate of the dependent.

In an exemplary embodiment of the invention, the method explained in conjunction with FIGS. 5A, 5B and 6 can be performed by using the following pseudo code:

```
Compute all the critical recurrence cycles in the loop;
For each edge in all critical recurrence cycles, mark
Pred_Promoted (dependent (edge))
= False;
For each critical recurrence cycle C in the loop {
    For each edge E in critical recurrence cycle C {
        If (Pred_Promoted (dependent(E))) { continue; }
        // The "control compare" instruction is the one that decides
            whether control stays in
the loop or exits the loop.
        // In the above example, instruction 10 is the control compare.
        If (Loop_carried (E) AND dependee (E) is not the control
            compare) {continue ;}
        If (dependent (E) is not predicated) {continue ;}
        If (Loop_independent (E) AND dependee (E) doesn't define
            the predicate for
dependent (E)) {continue ;}
        If (the predicate for dependent (E) is not the same as the predicate
            for the loop-
back branch) {continue ;}
        // The candidate for predicate promotion should be invertible,
            such as "add
immediate", or "shladd", etc.
        // That is, we should be able to recover from its speculative
            execution, by executing
its inverse in the loop exit(s).
        If (dependent (E) is not invertible outside the loop) {continue ;}
        If (any use of dependent (E) in the current iteration doesn't have
            the same
predicate as dependent (E)) {continue ;}
        Predicate (dependent (E)) = p0; // Do the predicate promotion
        Pred_Promoted (dependent (E)) = True;
        // If the result produced by dependent (E) is live out of the loop,
            make sure to invert
it outside the loop as necessary.
        If (the result of dependent (E) is live-out) {
            Add instructions in the loop exit to compute the complement
```

-continued

```
      pC of predicate
   (dependent (E));
         Create an inverse of dependent (E) in the loop exit and
         predicate it with pC;
         }
   } End For each edge E;
} End For each critical recurrence cycle;
```

FIG. 7 shows an exemplary embodiment of predicate-promoted software loop 702, in accordance with an embodiment of the invention. In FIG. 7 some predicated instructions shown in FIG. 2 have been predicate promoted. In first critical recurrence cycle 204, predicate V47 is removed from instructions (5) and (6), to produce instructions (5) and (6) of a first critical recurrence cycle 704. Instructions (5) and (6) are therefore executed speculatively earlier in the sequence, parallel to instruction (4). Therefore, the recurrence 11 of first critical recurrence cycle 204 is reduced from seven cycles to five cycles. First critical recurrence cycle 204 is reduced to first critical recurrence cycle 704, i.e., (1)→(2)→(3)→(4)→(7)→(1). In an embodiment, the pseudo code provided above, pertaining to the method explained in conjunction with FIGS. 4A and 4B, can be used to transform the instruction of first critical recurrence cycle 204 into the instructions of first critical recurrence cycle 704.

Similarly, in second critical recurrence cycle 206, predicate V49 is removed from instruction (9), to produce instruction (9) of second critical recurrence cycle 706. Instruction (9) is executed parallel to instruction (8). Therefore, the recurrence II of second critical recurrence cycle 206 is reduced from four to three. Second critical recurrence cycle 206 is reduced to second critical recurrence cycle 706, i.e., (7)→(8)→(10)→(7). In an embodiment, the pseudo code provided above, pertaining to the method explained in conjunction with FIGS. 5A, 5B, and 6, can be used to transform the instructions of second critical recurrence cycle 206 into the instructions of second critical recurrence cycle 706 and new instructions (12), (13), and (14) after the loop exit.

Referring to new instructions (12), (13), and (14), the result of instruction (9) is live outside software loop 202. Hence, instruction (9) is inverted outside the software loop 202, to maintain the logic of software loop 202. This is done by adding instructions (12), (13) and (14) to software loop 202 in software loop 702. A result of instructions (12) and (13) is stored in virtual predicate register V50, which acts as a complement of predicate V49 of instruction (9). Instruction (14) is an inverse of instruction (9) and is predicated by virtual predicate register V50. For example, referring to FIG. 2, if the virtual predicate register V49 stores a value "0", instruction (9) should not have been executed. However, referring to FIG. 7, instruction (9) has been predicate promoted and is therefore executed speculatively. The execution of instruction (9) results in the decrement of the value stored in the virtual general-purpose register V1 by one. Hence, to restore the correct value of the virtual general-purpose register V1, in instruction (14), the value stored in the virtual general-purpose register V1 is increased by one.

Figure 8:
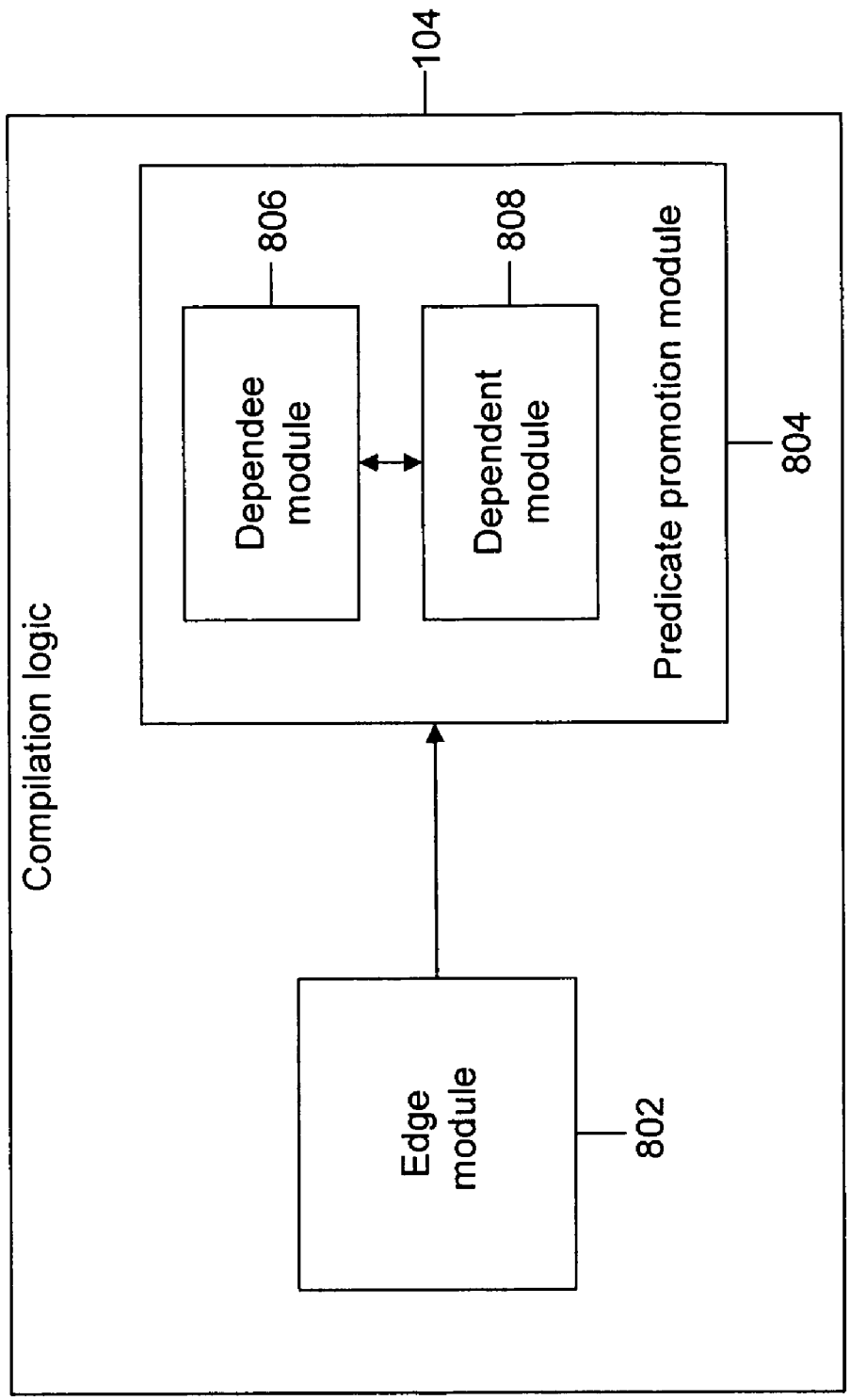
FIG. 8 is a block diagram illustrating a compilation logic, in accordance with an embodiment of the invention.

FIG. 8 is a block diagram illustrating compilation logic 104, in accordance with an embodiment of the invention. Compilation logic 104 includes an edge module 802 and a predicate promotion module 804. Edge module 802 determines an edge in the critical recurrence cycle. Predicate promotion module 804 performs the predicate promotion of at least one of the dependee and the dependent. The predicate promotion is performed if a set of pre-determined conditions is met. In an embodiment of the invention, the set of pre-determined conditions is selected in accordance with the conditions described with reference to FIGS. 4A, 4B, 5A, and 5B.

Predicate promotion module 804 includes a dependee module 806 and a dependent module 808. Dependee module 806 performs the predicate promotion of the dependee. Dependee module 806 checks a first set of conditions before performing the predicate promotion of the dependee. In various embodiments, dependee module 806 performs the predicate promotion by using the method, as described in conjunction with FIGS. 4A and 4B. Dependent module 808 performs the predicate promotion of the dependent. Dependent module 808 checks a second set of conditions before performing the predicate promotion of the dependent. In various embodiments, dependent module 808 performs the predicate promotion by using the method, as described in conjunction with FIGS. 5A and 5B.

In various embodiments of the invention, the elements of the system described above can be implemented as software logic, hardware logic, or a combination thereof.

In accordance with an alternate embodiment of the invention, dependee module 806 and dependent module 808 can be combined to form a single module for the performance of the predicate promotion of at least one of the dependee and the dependent.

It will be apparent to a person skilled in the art that the methods, according to various embodiments of the invention, may be embodied in a computer program product.

The various embodiments of the invention provide methods and systems that can be implemented on software loops with at least one critical recurrence cycle. Further, the software loops may be unrolled, software-pipelined, or circular scheduled. Moreover, the various embodiments of the invention provide methods and systems that can be implemented on compiler architectures such as in-order and out-of-order. Further, the various embodiments of the invention provide methods and systems that can be implemented before other recurrence reduction techniques such as riffling have been applied.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the software that constitute the method of the present invention.

The computer system comprises a computer, an input device, a display unit, and the Internet. The computer can incorporate a microprocessor. The microprocessor can be connected to a communication bus. The computer can also include a memory. The memory may include Random Access Memory (RAM) and/or Read Only Memory (ROM). The computer system can further incorporate a storage device. The storage device can include a hard disk drive or a removable storage drive, such as a floppy disk drive and/or an optical disk drive. Storage device can also be other similar device for loading computer programs or other instructions into the computer system.

The computer system executes a set of instructions that are stored in one or more storage elements, in order to process input data. The storage elements may also hold data or other information as required. The storage element may be in the form of an information source or a physical memory element present in the processing machine.

The set of instructions may include various commands that instruct the processing machine to perform specific tasks such as the software that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

The term logic may include, by way of example, software or hardware and/or combinations of software and hardware.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method comprising:
    determining at least one edge in a critical recurrence cycle in a software loop, each edge comprising a dependee and a dependent, wherein the dependee comprises a first instruction that produces a result, the dependent comprises a second instruction that uses the result, the dependee and the dependent are associated with a virtual predicate register, and the virtual predicate register includes a value used to determine whether to execute the first and second instruction; and
    for each of the at least one edge, disassociating the virtual predicate register from the dependee of the edge if a plurality of pre-determined conditions are met, wherein disassociating the virtual predicate register from the dependee is performed such that logic of the software loop is maintained, wherein the plurality of pre-determined conditions includes
        the edge being a loop-independent edge, wherein the edge is a loop-independent edge if the dependee and the dependent are executed in same iteration of the software loop,
        the dependee not being a load instruction and the dependee not being a store instruction.

2. The method of claim 1, wherein the plurality of pre-determined conditions further includes the dependee and the dependent having a register dependency.

3. The method of claim 1, wherein the plurality of pre-determined conditions further includes:
    the dependee of the edge having loop-independent dependents, wherein the loop-independent dependents use the result of the dependee in the same iteration of the software loop in which the result is produced, and
    the result of the dependee being limited in the software loop.

4. The method of claim 1, wherein the plurality of pre-determined conditions further includes the edge being a loop-carried edge, wherein the edge is a loop-carried edge if the dependee and the dependent are executed in different iterations of the software loop.

5. The method of claim 1, wherein the plurality of pre-determined conditions further includes the dependee and each instruction that uses the result of the dependee in the same iteration of the software loop having the same predicate.

6. The method of claim 1, wherein the plurality of pre-determined conditions further includes the dependent being invertible outside the software loop.

7. The method of claim 6 further comprising inverting the result of the dependent outside the software loop if the result of the dependent is live outside the software loop.

8. The method of claim 7, wherein inverting the result of the dependent outside the software loop further includes:
    adding an additional instruction outside the software loop, the additional instruction being the inverse of the dependent, and
    predicating the additional instruction with the complement of the predicate of the dependent.

9. The method of claim 1, wherein the plurality of pre-determined conditions further includes the dependee and the dependent not involving floating point registers, wherein floating point registers store floating point values.

10. A computer program product comprising a computer usable physical storage medium having a computer readable program code embodied therein, the computer readable program code performing:
    determining at least one edge in a critical recurrence cycle in a software loop, each edge comprising a dependee and a dependent, wherein the dependee comprises a first instruction that produces a result, the dependent comprises a second instruction that uses the result, the first and the second instructions are associated with a virtual predicate register, and the virtual predicate register includes a value used to determine whether to execute the first and second instruction; and
    for each of the at least one edge, disassociating the virtual predicate register from the dependee of the edge if a plurality of pre-determined conditions are met, wherein disassociating the virtual predicate register from the dependee is performed such that logic of the software loop is maintained, wherein the plurality of pre-determined conditions include
        the edge being a loop-independent edge, wherein the edge is a loop-independent edge if the dependee and the dependent are executed in same iteration of the software loop,
        the dependee not being a load instruction and the dependee not being a store instruction.

11. The computer program product of claim 10, wherein the plurality of pre-determined conditions further includes the dependee and the dependent not involving floating point registers, wherein floating point registers store floating point values.

* * * * *